(12) United States Patent
Zargari et al.

(10) Patent No.: US 8,471,514 B2
(45) Date of Patent: Jun. 25, 2013

(54) ADAPTIVE HARMONIC REDUCTION APPARATUS AND METHODS

(75) Inventors: Navid Zargari, Cambridge (CA); Zhongyuan Cheng, Cambridge (CA); Yuan Xiao, Kitchener (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 329 days.

(21) Appl. No.: 12/894,646

(22) Filed: Sep. 30, 2010

(65) Prior Publication Data

US 2012/0081061 A1    Apr. 5, 2012

(51) Int. Cl.
*H02P 27/08* (2006.01)
*H02P 27/04* (2006.01)

(52) U.S. Cl.
CPC ................ *H02P 27/04* (2013.01)
USPC ......... 318/503; 318/448; 318/508; 318/509; 318/510

(58) Field of Classification Search
CPC ........................................ H02P 27/04
USPC .................. 318/503, 508–510, 448
See application file for complete search history.

(56) References Cited

U.S. PATENT DOCUMENTS

| | | | |
|---|---|---|---|
| 4,626,978 A * | 12/1986 | Thouvenin ............... | 363/36 |
| 5,355,297 A | 10/1994 | Kawabata et al. | |
| 5,361,196 A | 11/1994 | Tanamachi et al. | |
| 5,383,107 A * | 1/1995 | Hopkins et al. ............ | 363/41 |
| 5,506,765 A | 4/1996 | Nakata et al. | |
| 5,627,742 A | 5/1997 | Nakata et al. | |
| 5,910,892 A | 6/1999 | Lyons et al. | |
| 6,166,929 A | 12/2000 | Ma et al. | |
| 6,191,966 B1 | 2/2001 | Yu | |
| 6,288,921 B1 | 9/2001 | Uchino et al. | |
| 6,333,569 B1 | 12/2001 | Kim | |
| 6,366,483 B1 | 4/2002 | Ma et al. | |
| 6,466,465 B1 | 10/2002 | Marwali | |
| 6,534,949 B2 | 3/2003 | Szczesny et al. | |
| 6,617,814 B1 | 9/2003 | Wu et al. | |
| 2006/0192520 A1 | 8/2006 | Yin et al. | |
| 2006/0192522 A1 | 8/2006 | Kerkman et al. | |
| 2006/0245216 A1 | 11/2006 | Wu et al. | |
| 2010/0072980 A1 | 3/2010 | Schmitt et al. | |
| 2010/0165674 A1 | 7/2010 | Dai et al. | |

OTHER PUBLICATIONS

Qingrong Zeng and Liuchen Chang, "Improved Current Controller Based on SVPWM for Three-Phase Grid-Connected Voltage Source Inverter", 2005 IEEE.
European Search Report, EP09180852, Jan. 6, 2010.
New Feedforward Space-Vector PWM Method to Obtain Balanced AC Output Voltages in a Three-Level Neutral-Point-Clamped Converter, Josep Pou, Dushan Boroyevich, Rafael Pindado, IEE Transactions on Industrial Electronics, vol. 49, No. 5, Oct. 2002.

(Continued)

*Primary Examiner* — Walter Benson
*Assistant Examiner* — David Luo
(74) *Attorney, Agent, or Firm* — Fay Sharpe LLP; Alexander Kuszewski; John M. Miller (57) ABSTRACT

Power conversion systems with active front end converters for example motor drives and power generation systems for distributed energy sources are presented with adaptive harmonic minimization for grid-tie converters for minimized or reduced total harmonic distortion in the line current spectrum including the source harmonic current and the grid-tie converter injected current spectrum referred to the line side.

30 Claims, 6 Drawing Sheets

OTHER PUBLICATIONS

Effects of Nonsinusoidal Voltage on the Operation Performance of a Three-Phase Induction Motor, Ching-Yin Lee, Wei-Jen Lee, IEEE Transactions on Energy Conversion, vol. 14, No. 2, Jun. 1999.

IEE Recommended Practices and Requirements for Harmonic Control in Electrical Power Systems, published by the Institute of Electrical and Electronic Engineers, Inc., New York, NY.

A Novel Space Vector Control of Three-Level PWM Converter, Lixiang Wei, Yuliang Wu, Chongjian Li, Huiqing Wang, Shixiang Liu Fahai Li, IEEE 1999 International Conference of Power Electronics and Drive Systems, PEDS'99, Jul. 1999, Hong Kong.

Juergen K. Steinke , Risto Vuolle, Herbert Prenner, Jukka Jarvinen, "New Variable Speed Drive with Proven Motor Friendly Performance for Medium Voltage Motors", 1999 IEEE.

Josep Pou, Dushan Boroyevich, Rafael Pindado, "New Feedforward Space-Vector PWM Method to Obtain Balanced AC Output Voltages in a Three-Level Neutral-Point-Clamped Converter".

"IEEE Recommended Practices and Requirements for Harmonic Control in Electrical Power Systems", IEEE Industry Applications Society/Power Engineering Society, Apr. 12, 1993.

Lixiang Wei, Yuliang Wu, Chongijan Li, Huiqing Wang, Shixiang Liu, and Fahai Li, "a Novel Space Vector Control of Three-Level PWM Converter", Department of Electrical Engineering, Tsinghua University, Beijing, P.R. 100084, 1999 IEEE.

Y. Shrivastava, C.K. Leee, S.Y.R. Hui, and H.S.H. Chung, "Comparison of RPWM and PWM Space Vector Switching Schemes for 3-Level Power Inverters", Department of Electronic Engineering, City University of Hong Kong, 2001 IEEE.

Subrata K. Mondal, Member, IEEE, Joao O.P. Pinto, Student Member IEEE, and Bimal K. Bose, Life Fellow, IEEE, "A Neural-Network-Based Space-Vector PWM Controller for a Three-Level Voltage-Fed Inverter Induction Motor Drive", 2002 IEEE.

Tadros Y. Salama, S. Hof, R., "Three Level IGBT Inverter", AEG Aktiengesellschaft, Institute of Drive Systems and Power Electronics, 1992 IEEE.

H. Du Toit Mouton, Member, IEEE, "Natural Balancing of Three-Level Neutral-Point-Clamped PWM Inverters", IEEE Transactions on Industrial Electronics, vol. 49, No. 5, Oct. 2002.

Comparison of RPWM and PWM Space Vector Switching Schemes for 3-Level Power Inverters, Y. Shrivastava, C.K. Lee, S.Y.R. Hui and H.S.H. Chung, Department of Electronic Engineering , City University of Hong Kong, with the University of Sydney , Australia.

A Neutral-Network-Based Space-Vector PWM Controller for a Three-Level Voltage-Fed Inverter Induction Motor Drive, Subrata K. Mondal, Joao O. P. Pinto, Bimal K. Bose, IEEE Transactions on Industry Applications, vol. 38, No. 3, May/Jun. 2002.

Tadros, Y.: Salama, S.; Hof, R., "Three-level TGBT inverter", Power Electronics Specialists Conference, 1992 PESC '92 Record, 23$^{rd}$ Annual IEEE Jun. 29-Jul. 3, 1992, pp. 46-52 vol. 1.

Du Toit Mouton, II., "Natural Balancing of Three-Level Neutralpoint Clamped PWM inverters", IEEE Transactions on, Industrial Electronics, V49, 15, pp. 1017-1025, 2002.

Alonso, O.; Marroyo, L.; Sanchis, P.; Gubia, E.; Guerrero, A., "Analysis of Neutral-Point Voltage Balancing Problem in Three-Level Neutral-Point Clamped Inverters with SVPWM Modulation", IEEE IEcon'02, V2, pp. 920-925, 2002.

DSP Based Space Vector PWM for Three-Level Inverter With DC-Link Voltage Voltage Balancing, Hyo L. Liu, Nam S. Choi and Gyu H. Cho.

Switching Loss Minimized Space Vector PWM Method for IGBT Three-Level Inverter, B. Kaku, I. Miyashita, S. Sone, IEEE Proc.-Electr. Power Appl., vol. 144, No. 3, May 1997.

A Neutral-Point-Clamped PWM Inverter, Akira Nabae, Isao Takahashi, Hirofumi Akagi, IEEE Transactions on Industry Applications , vol. 1A-17, No. 5, Sep./Oct. 1981.

ACS 1000-World's First Standard AC Drive for Medium-voltage Applications, Sohail Malik, Dieter Kluge, ABB Review Feb. 1998.

New Variable Speed Drive with Proven Motor Friendly Performance for Medium Voltage Motors, Juergen K. Steinke and Risto Vuolle, Herbert Prenner, Jukka Jarvinen.

Pou, J.; Boroyevich, D.; Pindado, R., "Effects of Imbalances and Nonlinear Loads on the Voltage Balance of a Neutra-Point-Clamped Inverter", Power Electronics, IEEE Transactions on vol. 20, Issue 1, Jan. 2005 pp. 123-131.

Celanovic, N.; Boroyevich, D., "A Comprehensive Study of Neutral-Point Voltage Balancing Problem in a Three-Level Neutral-Point Clamped Voltage Source PWM Inverters", IEEE Transactions on, Power Electronics, V15, 12, pp. 242-249, 2000.

Shinohara, K.; Sakasegawa, E., "A New PWM Method with Suppressed Neutral Point Potential Variation of Three Level Inverter for AC Servo Motor Drive", Power Electronics and Drive Systems, 1999. PEDS "99. Proceedings of the IEEE 1999 International Conference on vol. 2, Jul. 27-29, 1999 pp. 668-672 vol. 2.

Tae Hyeong Seo Chang Ho Choi, Compensation for the Neutral-Point Potential Variation in Three-Level Space Vector PWM, APAE 2001, vol. 2, on pp. 1135-1140 vol. 2.

Holtz, J.; Springob, L., "Reduce Harmonics PWM Controlled Line-Side Converter for Electric Drives", Industry Applications, IEEE Transactions on vol. 29, Issue 4, Jul.-Aug. 1993 pp. 814-819.

Liu, H.L.; Cho, G.H., "Three-Level Space vector PWM in Low Index Modulation Region Avoiding Narrow Pulse Problem", Power Electronics, IEEE Transactions on vol. 9, Issue 5, Sep. 1994 pp. 481-486.

Seixas, P.F.; Severo Mendes, M.A.; Donoso-Garcia, P.; Lima, A.M. N., "A Space Vector PWM Method for Three-Level Voltage Source Inverters", Applied Power Electronics Conference and Exposition, 2000. APEC 2000. Fifteenth Annual IEEE vol. 1, Feb. 6-10, 2000 pp. 549-555 vol. 1.

Fei Wang, "Sin-Triangle Versus Space-Vector Modulation for Three-Level PWM Voltage-Source Inverters", Industry Applications, IEEE Transactions on vol. 38, Issue 2, Mar.-Apr. 2002 pp. 500-506.

Quiang Song; Wenhua Liu; Qingguang Yu; Xiaorong Xie; Zhonghong Wang, "A Neutral-Point Potential Balancing Algorithm for Three-Level NPC Inverters Using Analytically Injected Zero-Sequence Voltage", Applied Power Electronics Conference and Exposition, 2003. APEC "03. Eighteenth Annual IEEE vol. 1, Feb. 9-13, 2003 pp. 228-233 vol. 1.

Koyama, M.; Fujii, t.; Uchida, R.; Kawabata, T., "Space Voltage Vector-Based New PWM Method for Large Capacity Three-Level GTO Inverter", Industrial Electronics, Control, Instrumentation, and Automation, 1992. "Power Electronics and Motion Control"., Proceedings of the 1992 International Conference on Nov. 9-13, 1992 pp. 271-276 vol. 1.

Tamai, S..; Koyama, M.; Fujii, T,; Mizoguchi, S.; Kawabata, t., "3 Level GTO Converter-Inverter Pair System for Large Capacity Induction Motor Drive", Power Electronics and Applications, 1993., Fifth European Conference on Sep. 13-16, 1993 pp. 45-50 vol. 5.

Lyons, J.P.; Vlalkovic, V.; Espelage, P.M.; Boeltner, F.H.; Larsen, E., "Innovation IGCT main drives", Industry Applications Conference, 1999. Thirty Fourth IAS Annual Meeting. Conference Record of the 1999 IEEEE vol. 4, Oct. 3-7, 1999 pp. 2655-2661 vol. 4.

Yo-Han Lee; Bum-Scok Suh; Chang-Ho Choi; Dong-Seok Hyun, "A New Neutral Point Current Control for a 3-Level Converter/Inverter Pair System", Industry Applications Conference, 1999. Thirty-Fourth IAS Annual Meeting. Conference Record of the 1999 IEEE vol. 3, Oct. 3-7, 1999 pp. 1528-1534 vol. 3.

Dongshcng Zhou; Rouaud, D.G., "Experimental Comparisons of Space Vector Neutral Point Balancing Strategies for Three-Level Topology", Power Electronis, IEEE Transactions o vol. 16, Issue 6, Nov. 2001 pp. 872-879.

Rodriguez, J.; Pontt, J.; Alzamora, G.; Becker, N.;Einenkel, O.; Weinstein, A.,"Novel 20-MW Downhill Conveyor System Using Three-Level converters", Industrial Electronis, IEEE Transactions on vol. 49, Issue 5, Oct. 2002 pp. 1093-1100.

Ogasawara, S.; Akagi, H., "Analysis of Variation of Neutral Point Potential in Neutral-Point Clamped Voltage Source PWM Inverters", Industry Applications Society Annual Meeting, 1993, Conference Record of the 1993 IEEE Oct. 2-8, 1993 pp. 965-970 vol. 2.

Navid R. Zargari, Steven C. Rizzo, Yuan Xiao, Hideo Iwamoto, Katsumi Satoh, and John F. Donlon, "A New Current-Source Converter Using a Symmetric Gate-Commutated Thyristor (SGCT)", 2001 IEEE.

Yoshitaka Iwaki, Takashi Sukegawa, Toshiaki Okuyama, Takashi Ikimi, Masakane Shigyo, and Masahiro Tobise, "A New PWM Method to Reduce Beat Phenomenon in Large-Capacity Inverters with Low Switching Frequency", IEEE Transactions on Industry Applications, vol. 35, No. 3, May/Jun. 1999.

Yun Wei Li, Bin Wu, Navid R. Zargari, Jason C. Wiseman, David Zu, "Damping of PWM Current Rectifier Using a Hybrid Combination Approach", IEEE Transactions on Power Electronics, vol. 22, No. 4, Jul. 2007.

Albert Ming Qui, Yun Wei Li, Bin Wu, Dewei Xu, Navid Zargari, and Yanfei Liu, "High Performance Current Source Inverter Fed Induction Motor Drive with Minimal Harmonic Distortion", Dept. Electrical & Computer Engineering Queen's University, Kingston ON.

Hamid R. Karshenas, Hassan Ali Lojori, Shashi B. Dewan, "Generalized Techniques of Selective Harmonic Elimination and Current Control in Current Source Inverters/Converters", IEEE Transactions on Power Electronics, vol. 10, No. 5, Sep. 1995.

Yuan Xiao, Bin Wu, Steven C. Rizzo, and Reza Sotudeh, "A Novel Power Factor Control Scheme for High-Power GTO Current-Source Converter", IEEE Transactions on Industry Applications, vol. 34, No. 6, Nov./Dec. 1998.

Jose R. Espinoza, Geza Joos, Johan I. Guzman, Luis A. Moran, and Rolando P. Burgos, "Selective Harmonic Elimination and Current/Voltage Control in Current/Voltage-Source Topologies: A Unified Approach", IEEE Transactions on Industrial Electronics, vol. 48, No. 1, Feb. 2001.

Bin Wu, Shashi B. Dewan, and Gordon R. Slemon, "PWM-CSI Inverter for Induction Motor Drives", IEEE Transactions on Industry Applications, vol. 28, No. 1, Jan./Feb. 1992.

Jose R. Espinoza, Geza Joos, Luis A. Cea, and Lautaro D. Salazar, "Space Vector Modulation Techniques for Current Source Rectifiers Operating at Switching Frequencies up to 1 kHz", 1998 IEEE.

Jack Daming Ma, Bin Wu, Navid R. Zargari, and Steven C. Rizzo, "A Space Vector Modulated CSI-Based AC Drive for Multimotor Applications", IEEE Transactions on Power Electronics, vol. 16, No. 4, Jul. 2001.

Yun Wei Li, Bin Wu, David Xu, and Navid R. Zargari, "Space Vector Sequence Investigation and Synchronization Methods for Active Front-End Rectifiers in High-Power Current-Source Drives", IEEE Transactions on Industrial Electronics, vol. 55, No. 3, Mar. 2008.

D. N. Zmood, and D.G. Holmes, "A Generalised Approach to the Modulation of Current Source Inverters", 1998 IEEE.

M.F. Naguib, Luiz A.C. Lopes, "Harmonics Reduction in Low Switching Frequency Space Vector Modulated Current Source Converters", Electrical and Computer Engineering Department Concordia University, Montreal, Canada, 2008 IEEE.

Jingya Dai, Yongqiang Lang, Bin Wu, Dewei Xu, and Navid Zargari, "A Multi-Sampling SVM Scheme for Current Source Converter with Superior Harmonic Permance", Dept. of Electrical and Computer Engineering.

Akira Nabae, Isao Takahashi, and Hirofumi Akagi, "A New Neutral-Point-Clamped PWM Inverter", IEEE Transactions on Industry Applications, vol. 1A-17, No. 5, September/October.

Josep Pou, Rafael Pindado, Dushan Boroyevich, and Pedro Rodriquez, "Limits of the Neutral-Point Balance in Back-to-Back-Connected Three-Level Converters", 2004 IEEE.

D.W.Kang, C.S. Ma, T.J. Kim, and D.S. Hyun, "Simple control strategy for balancing the DC-link voltage of neutral-point-clamped inverter at low modulation index", IEE Proc.-Electr. Power Appl., vol. 151, No. 5, Sep. 2004.

Shengming Li ND Longya Xu, "Fault-tolerant operation of a 150kw 3-level neutral-point-clamped PWM Inverter in a flywheel energy storage system", The Ohio State University, 2001 IEEE.

Mario Marchesoni, Paolo Segarich, and Ernesto Soressi, "A new control strategy for neutral-point-clamped active rectifiers", IEEE Transactions on Industrial Electronics, vol. 52, No. 2, Apr. 2005.

Satoshi Ogasawara and Hirofumi Akagi, "A vector control system using a neutral-point-clamped voltage source PWM inverter", Nagaoka University of Technology, 1991 IEEE.

Roberto Rojas, Tokuo Ohynishi, and Takayuki Suzuki, "Neutral-point-clamped inverter with improved voltage waveform and control range" The University of Tokushima, 1993 IEEE.

Jason C. Wiseman and Bin Wu, "Active damping control of a high-power PWM current-source rectifier for line-current THD reduction", 2005 IEEE.

Ching-Yin Lee and Wei-Jen Lee, "Effects pf Nonsinusoidal Voltage on Operation Performance of a Three-phase Induction Motor", 1997 IEEE.

Bin Wu, "Power converter systems", Wiley Press, 2006.

Bin Wu, High-power converters and ac drives, A John Wiley & Sons, Inc., 2006.

* cited by examiner

SWITCHING ANGLE SET TABLE 152

| SIGNIFICANT HARMONICS RANGE | RECTIFIER DELAY ANGLE | MOTOR SPEED | SWITCHING ANGLE SET |
|---|---|---|---|
| RANGE 1 | DELAY ANGLE 1 | SPEED 1 | $\theta_{1,1}; \theta_{1,2}; \theta_{1,3}; \theta_{1,4}; \theta_{1,5}; \theta_{1,6}; \theta_{1,7}; \theta_{1,8}; \theta_{1,9};\ldots; \theta_{1,18}$ |
| RANGE 1 | DELAY ANGLE 1 | SPEED 2 | $\theta_{2,1}; \theta_{2,2}; \theta_{2,3}; \theta_{2,4}; \theta_{2,5}; \theta_{2,6}; \theta_{2,7}; \theta_{2,8}; \theta_{2,9};\ldots; \theta_{2,18}$ |
| RANGE 1 | DELAY ANGLE 2 | SPEED 1 | $\theta_{3,1}; \theta_{3,2}; \theta_{3,3}; \theta_{3,4}; \theta_{3,5}; \theta_{3,6}; \theta_{3,7}; \theta_{3,8}; \theta_{3,9};\ldots; \theta_{3,18}$ |
| RANGE 1 | DELAY ANGLE 2 | SPEED 2 | $\theta_{4,1}; \theta_{4,2}; \theta_{4,3}; \theta_{4,4}; \theta_{4,5}; \theta_{4,6}; \theta_{4,7}; \theta_{4,8}; \theta_{4,9};\ldots; \theta_{4,18}$ |
| RANGE 2 | DELAY ANGLE 1 | SPEED 1 | $\theta_{5,1}; \theta_{5,2}; \theta_{5,3}; \theta_{5,4}; \theta_{5,5}; \theta_{5,6}; \theta_{5,7}; \theta_{5,8}; \theta_{5,9};\ldots; \theta_{5,18}$ |
| RANGE 2 | DELAY ANGLE 1 | SPEED 2 | $\theta_{6,1}; \theta_{6,2}; \theta_{6,3}; \theta_{6,4}; \theta_{6,5}; \theta_{6,6}; \theta_{6,7}; \theta_{6,8}; \theta_{6,9};\ldots; \theta_{6,18}$ |
| RANGE 2 | DELAY ANGLE 2 | SPEED 1 | $\theta_{7,1}; \theta_{7,2}; \theta_{7,3}; \theta_{7,4}; \theta_{7,5}; \theta_{7,6}; \theta_{7,7}; \theta_{7,8}; \theta_{7,9};\ldots; \theta_{7,18}$ |
| RANGE 2 | DELAY ANGLE 2 | SPEED 2 | $\theta_{8,1}; \theta_{8,2}; \theta_{8,3}; \theta_{8,4}; \theta_{8,5}; \theta_{8,6}; \theta_{8,7}; \theta_{8,8}; \theta_{8,9};\ldots; \theta_{8,18}$ |
| RANGE 3 | DELAY ANGLE 1 | SPEED 1 | $\theta_{9,1}; \theta_{9,2}; \theta_{9,3}; \theta_{9,4}; \theta_{9,5}; \theta_{9,6}; \theta_{9,7}; \theta_{9,8}; \theta_{9,9};\ldots; \theta_{9,18}$ |
| RANGE 3 | DELAY ANGLE 1 | SPEED 2 | $\theta_{10,1}; \theta_{10,2}; \theta_{10,3}; \theta_{10,4}; \theta_{10,5}; \theta_{10,6}; \theta_{10,7}; \theta_{10,8}; \theta_{10,9};\ldots; \theta_{10,18}$ |
| RANGE 3 | DELAY ANGLE 2 | SPEED 1 | $\theta_{11,1}; \theta_{11,2}; \theta_{11,3}; \theta_{11,4}; \theta_{11,5}; \theta_{11,6}; \theta_{11,7}; \theta_{11,8}; \theta_{11,9};\ldots; \theta_{11,18}$ |
| RANGE 3 | DELAY ANGLE 2 | SPEED 2 | $\theta_{12,1}; \theta_{12,2}; \theta_{12,3}; \theta_{12,4}; \theta_{12,5}; \theta_{12,6}; \theta_{12,7}; \theta_{12,8}; \theta_{12,9};\ldots; \theta_{12,18}$ |
| ⋮ | ⋮ | ⋮ | ⋮ |
| RANGE N | DELAY ANGLE 1 | SPEED 1 | $\theta_{3N,1}; \theta_{3N,2}; \theta_{3N,3}; \theta_{3N,4}; \theta_{3N,5}; \theta_{3N,6}; \theta_{3N,7}; \theta_{3N,8}; \theta_{3N,9};\ldots; \theta_{3N,18}$ |
| RANGE N | DELAY ANGLE 1 | SPEED 2 | $\theta_{3N+1,1}; \theta_{3N+1,2}; \theta_{3N+1,3}; \theta_{3N+1,4}; \theta_{3N+1,5}; \theta_{3N+1,6}; \theta_{3N+1,7}; \theta_{3N+1,8}; \theta_{3N+1,9};\ldots; \theta_{3N+1,18}$ |
| RANGE N | DELAY ANGLE 2 | SPEED 1 | $\theta_{3N+2,1}; \theta_{3N+2,2}; \theta_{3N+2,3}; \theta_{3N+2,4}; \theta_{3N+2,5}; \theta_{3N+2,6}; \theta_{3N+2,7}; \theta_{3N+2,8}; \theta_{3N+2,9};\ldots; \theta_{3N+2,18}$ |
| RANGE N | DELAY ANGLE 2 | SPEED 2 | $\theta_{3N+3,1}; \theta_{3N+3,2}; \theta_{3N+3,3}; \theta_{3N+3,4}; \theta_{3N+3,5}; \theta_{3N+3,6}; \theta_{3N+3,7}; \theta_{3N+3,8}; \theta_{3N+3,9};\ldots; \theta_{3N+3,18}$ |

ADAPTIVE HARMONIC REDUCTION APPARATUS AND METHODS

BACKGROUND

Motor drives and other forms of power conversion systems convert electrical power from one form to another and may be employed in a variety of applications such as powering an electric motor using power converted from a single or multiphase AC input source, converting AC power from a wind driven generator to supply power to a grid, etc. Power converters may include multiple stages for different types of conversion applications, such as AC/DC/AC drives for electric motors having a pulse width modulated (PWM) active current source rectifier in which AC input power is selectively switched to create a DC output bus voltage from which a load is driven by a PWM controlled inverter stage. This type of converter is particularly useful in driving electric motors in industrial applications requiring variable speed control with varying motor load situations. Control of harmonics in such power conversion systems is a continuous challenge, particularly where an active input converter stage is used to interface with the utility grid. Conventional approaches to harmonic spectrum control include the use of predetermined rectifier firing angles for selective harmonic elimination (SHE), as well as the provision of hardware-based input filter circuits at the rectifier input. However, these techniques have thus far provided only limited success in controlling total harmonic distortion (THD) and input filter circuits are expensive. A continuing need therefore exists for improved motor drives and harmonic control techniques in motor drives and other switching-type power conversion systems.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. The present disclosure provides pulse width modulation switching techniques for grid-tie converters, such as rectifiers, in which firing angle switching control is used to perform selective harmonic reduction as well as to reduce total harmonic distortion (THD) in the total line current spectrum including the source current spectrum and a grid-tie converter current spectrum referred to the line side. The grid-converter could be a rectifier in a motor drive which mainly transfers power from the grid or generator to the motor, or an inverter in a distributed power generation system which transfers power from the distributed energy sources for example photovoltaic cells or wind turbines, to the grid.

A power conversion system is disclosed, such as a motor drive or distributed power distribution system in certain embodiments, including an active rectifier with an input filter and switching devices operated by rectifier switching control signals to selectively couple corresponding AC input nodes with DC output nodes. The converter also includes an intermediate DC circuit coupled with the first and second DC output nodes of the rectifier, as well as an inverter to convert DC power from the intermediate circuit to supply power to a load, such as a motor in certain embodiments. In certain embodiments, the rectifier is a current source rectifier and the intermediate circuit includes at least one inductance. In other embodiments, the rectifier is a voltage source converter, such as a 2-level or multi-level voltage source rectifier. A switch control system is included, having a rectifier control component with a switching angle generator and a PWM controller. The switching angle generator computes a set of rectifier switching angles substantially in real time at least partially according to a signal or value indicating source harmonics at the rectifier AC input and according to the rectifier input filter transfer function. The PWM controller provides pulse width modulated rectifier switching control signals according to the set of rectifier switching angles from the angle generator in order to convert AC electrical input power to provide regulated DC power to the intermediate DC circuit.

In certain embodiments, the switching angle generator computes the switching angles at least partially according to at least one harmonic to be reduced or eliminated, and according to a desired maximum total harmonic distortion (THD) value.

In certain embodiments, the angle generator computes a source current or voltage spectrum according to a measured or determined source current or voltage, computes a rectifier input current or voltage spectrum, and applies the input filter transfer function to the rectifier input current or voltage spectrum to refer the rectifier input current or voltage spectrum to the line side to obtain a referred rectifier input current or voltage spectrum. The angle generator in these embodiments computes a total line current or voltage spectrum as a sum of the source current or voltage spectrum and the referred rectifier input current or voltage spectrum, forms an equation system based at least partially on the total line current or voltage spectrum, and solves the equation system to obtain the set of rectifier switching angles. In certain implementations, the angle generator forms the equation system at least partially according to the harmonic(s) to be reduced or eliminated and according to the desired THD value.

In accordance with further aspects of the disclosure, a power conversion system, such as a motor drive, is provided, which includes an active rectifier with an input filter and switching devices operated by rectifier switching control signals, as well as an intermediate DC circuit coupled with the first and second DC output nodes of the rectifier, and an inverter to convert DC power from the intermediate circuit to supply power to a load. The drive also includes a switch control system with a rectifier control component having a table storing a plurality of sets of rectifier switching angles and a PWM controller. The PWM controller selects one of the switching angle sets at least partially according to a signal or value indicating source harmonics at the AC input of the rectifier, and provides PWM rectifier switching control signals to convert AC electrical input power to provide regulated DC power to the intermediate DC circuit.

Further aspects of the disclosure provide methods for computing a set of rectifier switching angles for generating pulse width modulated rectifier switching control signals in a power conversion system. The method includes forming an equation system based at least partially on a current or voltage spectrum of the power conversion system, one or more harmonics to be reduced or eliminated, and a desired THD value, as well as solving the equation system to obtain the set of rectifier switching angles, where the set of rectifier switching angles in certain embodiments is solved in real time.

In certain embodiments, the equation system is formed at least partially according to a total line current or voltage spectrum as including a source current or voltage spectrum and a rectifier input current or voltage spectrum referred to the line side.

In certain embodiments, the method includes computing a source current or voltage spectrum according to a measured or determined source current or voltage, computing a rectifier input current or voltage spectrum according to a measured rectifier DC current or voltage, and applying the rectifier input filter transfer function to the rectifier input current or voltage spectrum to refer the rectifier input current or voltage spectrum to the line side, as well as computing a total line current or voltage spectrum as a sum of the source current or voltage spectrum and the referred rectifier input current or voltage spectrum, with the equation system being formed at least partially according to the total line current or voltage spectrum.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 3 is an exemplary switching angle set table in the rectifier controller of FIG. 1 with firing angle sets corresponding to various harmonic condition ranges;

DETAILED DESCRIPTION

Several embodiments or implementations are hereinafter described in conjunction with the drawings, wherein like reference numerals are used to refer to like elements throughout, and wherein the various features are not necessarily drawn to scale.

Power converters are disclosed along with rectifier SHE control systems and methods in which firing or switching angles are computed in real time or are predetermined and stored in a table for selection according to harmonic conditions at the converter input. The PWM switching control of the rectifier is done in a manner that provides for selective elimination or reduction of one or more particular harmonics, and also controls total harmonic distortion (THD) in a harmonic range of interest, with these goals being tailored to specific source harmonic conditions. These aspects alone or in combination provide significant advances over conventional pulse width control techniques, particularly in combination with hardware-based input line filter circuitry to provide DC power for driving an output inverter while controlling the line harmonic content. The inventors have appreciated that conventional programmed switching pattern techniques such as selective harmonic elimination (SHE) typically employ a set of pre-calculated switching angles to fire semiconductor-based power switching devices of an input rectifier.

The goal of SHE approaches is to control the frequency content or spectrum to ideally eliminate certain harmonics (e.g., such as $5^{th}$, $7^{th}$, etc.), with higher-order harmonics being suppressed by adding a low-pass filter to the input. The physical size of the filter circuit components is determined by the hardware filter resonant frequency, which in turn is determined by the SHE spectrum. For example, the resonant frequency of an input filter used in conjunction with a 7-pulse SHE pattern is typically lower than 5 pu for controlling higher-order harmonics. The filter resonant frequency is set by the inductance and capacitance of the filter, with lower resonant frequencies corresponding to larger inductances and capacitances and accordingly to higher cost and larger size. Increased filter capacitance additionally causes leading power factor, which is undesired in most applications. SHE switching angles have previously been calculated by solving equation systems derived from Fourier analysis, where certain harmonics are ideally eliminated by forcing some harmonics to be zero in the equation set. In the conventional approach, however, the equations are constructed assuming an ideal DC link and a harmonic-free source, without consideration of the hardware filter characteristics. The hardware filter is designed afterwards according to the spectrum generated by the computed SHE firing angles, with the filter tuning point generally lower than 5 pu.

Figure 1:
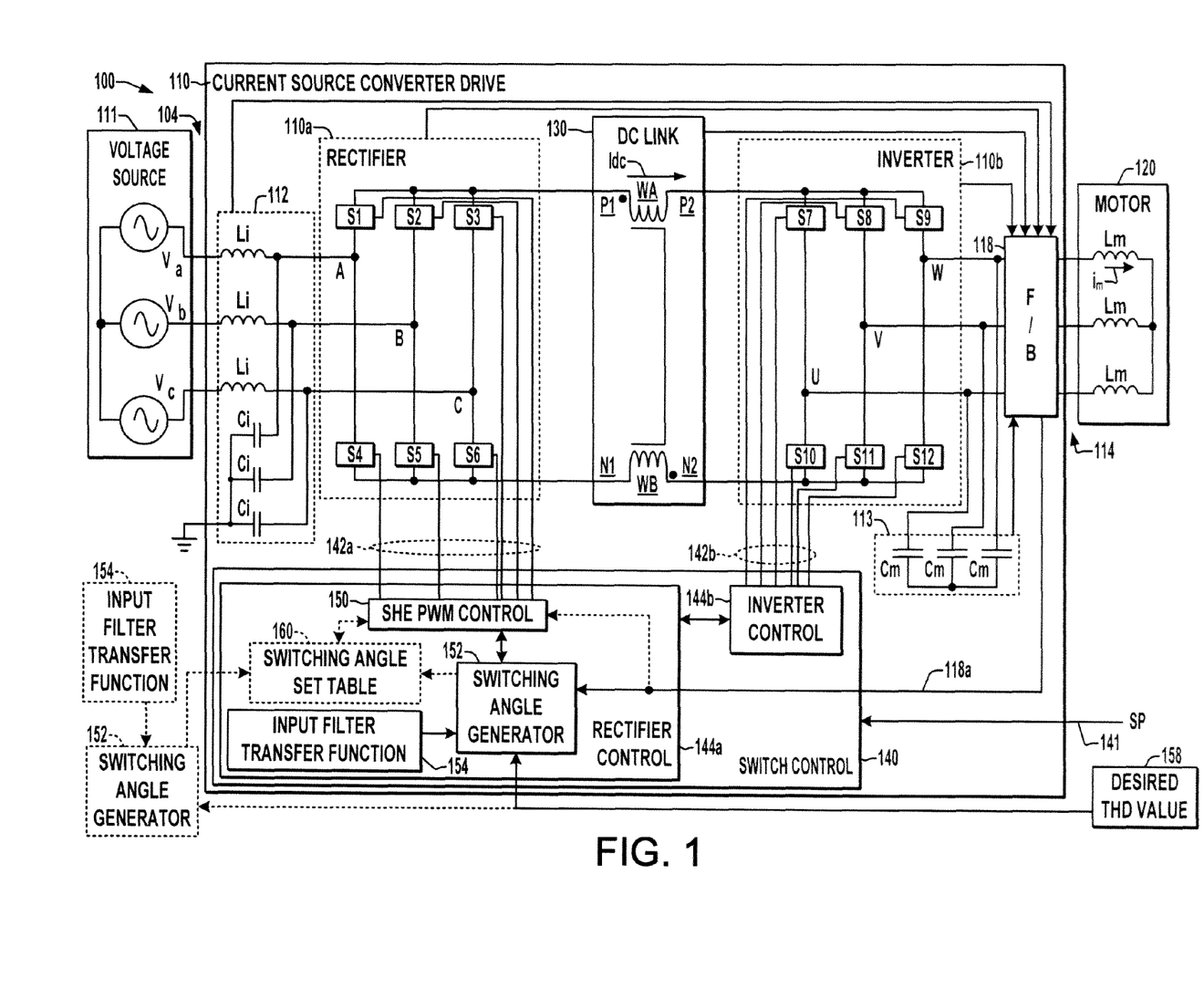
FIG. 1 is a schematic diagram illustrating an exemplary current source converter type variable frequency motor drive with adaptive harmonic elimination PWM switching control for an active rectifier in accordance with one or more aspects of the present disclosure.

Referring initially to FIG. 1, an exemplary power conversion system 100 is illustrated, which includes a current source converter (CSC) type motor drive 110 driving a motor load 120. While illustrated in connection with a current source type converter 110 with an LF input filter 112 and a C output filter 113, other embodiments are possible using a voltage source type converter 110 with a CL or LCL input filter 112 and with or without an LC output filter 113. In certain embodiments, the conversion system 100 includes a current source rectifier and an intermediate circuit having one or more inductances. In certain embodiments, the power conversion 100 system is a distributed power generation system in which the rectifier is a grid-tie current source converter and the intermediate circuit includes at least one inductance, or the rectifier may be a 2-level or multilevel grid-tie voltage source converter and the intermediate circuit includes at least one capacitance.

The drive 110 includes a rectifier 110a with an AC input circuit 104 including a rectifier input filter 112 coupled with a three-phase AC voltage source 111 providing input power to the drive 110, and the drive 110 converts the input power to provide motor current $i_m$ to drive a motor load 120 having phase windings with associated inductances Lm coupled to a converter output 114. The drive 110 is a current source converter (CSC) type, with a filter circuit 112 connected to the AC power source 111. While these examples are illustrated as having a three phase input 104, other embodiments may provide a single phase AC input or may include a multiphase input adapted to receive three or more input phases. The CSC drive 110 in FIG. 1 provides variable frequency, variable amplitude single or multiphase AC output power at output terminals 114 to drive an AC motor load 120, which has three phase windings in the illustrated example. The output 114 in other embodiments may provide a single phase AC output or may be of any number of phases, and may power a load other than a motor, such as a power grid in a wind energy system, for example. The illustrated motor drive 110 includes both input filter capacitors Ci in the input filter 112, as well as output filter capacitors Cm in an output filter circuit 113. The input filter capacitors Ci are coupled between corresponding input phase lines A, B, and C and an input neutral node. The output capacitors Cm are individually coupled between a corresponding output phase line U, V, and W and an output neutral node. Certain embodiments may omit either or both of the input or output filter capacitor sets. The input and output neutral nodes may be floating in certain embodiments, or one or both of the neutrals may be coupled to the ground of the input power source or to another ground. In still other possible embodiments, the neutrals may be coupled to one another directly or through an impedance without reference to any system ground. In the illustrated example, the node is grounded.

The drive 110 includes a rectifier 110*a* receiving the AC input power from the source 111 via an input 112, as well as an intermediate DC circuit 130 with a DC link inductance (link choke) having upper and lower windings WA and WB coupled between the rectifier 110*a* and an output inverter 110*b*. In certain embodiments, the DC link could be a simple DC link inductor or a common mode choke with windings in each of the upper and lower DC current paths as in the illustrated example. In other embodiments, a single link inductor could be provided in only one of the upper and lower Dc current paths. In still other embodiments, the drive 110 could be a voltage source converter drive with an intermediate DC bus voltage established in the circuit 130, with a capacitance (single or multiple capacitors) connected between the upper and lower DC branches. The illustrated drive 110 provides input filtering including inductors Li in each input phase and input filter capacitors Ci coupled between the input lines A, B, C, and the input neutral node. The rectifier 110*a* is a current source rectifier (CSR) coupled with a current source inverter (CSI) 110*b* by the intermediate DC circuit 130, and one or more isolation components (e.g., transformers, not shown) may optionally be included in the drive 110. The output 114 provides AC electrical output power to the motor load 120 via lines U, V, and W, and includes filter circuit 113 with the output capacitors Cm coupled between the load 120 and the output neutral node.

The rectifier 110*a* is an active switching-type current source rectifier (CSR) with switching devices S1-S6 coupled between the input 112 and the DC circuit 130 and operates according to a plurality of rectifier switching control signals 142*a* provided by a rectifier control component 144*a* of a switch control system 140. In operation, the AC input power is switched by the rectifier switches S1-S6 to create an intermediate DC link current Idc in the intermediate circuit 130. The exemplary inverter 110*b* is a current source inverter (CSI) that includes switching devices S7-S12 coupled between the DC circuit 130 and phase lines U, V, and W of the output 114. The inverter switches S7-S12 are operated according to corresponding switching control signals 142*b* from an inverter control component 144*b* of the switch control system 140 to selectively convert DC power from the DC circuit 130 to provide the AC output power to drive the motor load 120.

In the intermediate DC (link) circuit 130, the DC link choke or inductor links the switches of the rectifier 110*a* and the inverter 110*b*, and provides forward and return current paths therebetween. The first winding WA of the link choke is coupled in a forward or positive DC path and has a first end P1 connected to the upper rectifier switches S1-S3 and a second end P2 coupled with the upper inverter switches S7-S9. The second (lower) winding WB is coupled in a negative or return DC path and has a first end N1 coupled to the lower rectifier switches S4-S6 as well as a second end N2 coupled to the lower inverter switches S10-S12.

The rectifier and inverter switching devices S1-S12 may be any suitable controllable electrical switch types (e.g., SGCTs, IGCTs, GTOs, thyristors, IGBTs, etc.) that are controlled according to any suitable type or form of switching scheme or schemes, such as phase control, pulse width modulation, etc., in open or closed-loop fashion. In certain embodiments, the switching devices S7-S12 of the inverter 110*b* are forced commutated devices including without limitation SGCTs, IGBTs or GTOs, and the switching devices S1-S6 of the rectifier 110*a* can be force commutated devices such as those mentioned above as well as line commutated devices such as Thyristors. In this regard, Thyristor devices could be used for the inverter switching devices S7-S12 in the form of forced commutated devices with extra circuitry added to the device triggering circuit thereof.

The rectifier 110*a* and the inverter 110*b* operate under control of the switch control system 140, which may include one or more processors and associated memory as well as I/O circuits including driver circuitry for generating switching control signals 142 to selectively actuate the switching devices S1-S12 although separate switching control systems may be employed, for example, with interconnections and information sharing to facilitate the coordinated operation of the rectifier 110*a* and the inverter 110*b*. The switch control system 140 in these embodiments includes an inverter control component 144*b* providing the inverter switching control signals 142*b* to cause the inverter 110*b* to selectively convert DC current from the intermediate DC circuit 130 to provide AC electrical power to the AC output 114 according to one or more setpoints 141, such as desired motor speed, torque, etc. The switch control system 140 and the components 144 thereof can be implemented as any suitable hardware, processor-executed software, processor-executed firmware, programmable logic, or combinations thereof, operative as any suitable controller or regulator by which the motor 120 is controlled according to one or more desired profile(s) or setpoint(s) 141, whether signals and/or digital values, in open or closed-loop fashion or combinations thereof.

In operation, moreover, a rectifier control component 144*a* of the controller 140 provides the rectifier switching control signals 142*a* to cause the rectifier 110*a* to convert AC electrical input power to provide a regulated DC current Idc to the DC circuit 130. In doing so, the rectifier controller 144*a* may employ one or more feedback signals or values 118*a*, such as a measured DC current value from the rectifier 110*a* representing the actual DC link current Idc and/or DC link voltage. The DC link current Idc from the rectifier 110*a* provides input current for conversion by the inverter 110*b*, where the exemplary inverter control 144*b* may provide a desired DC link current signal or value as a regulation setpoint to the rectifier controller 144*a*. In this manner, the rectifier 110*a* provides the DC current required by the inverter 110*b*, and the rectifier controller 144*a* may also implement other control functions such as power factor correction, while the inverter controller 144*b* performs the necessary motor control operation of the drive 110 according to one or more setpoint values or signals 141.

The drive 110 also includes a feedback system 118 including one or more sensing elements operative to provide one or more feedback signals and/or values 118a indicative of electrical conditions at the input 112, the rectifier 110a, the intermediate DC circuit 130, the inverter 110b, the output filter 113, and/or at the output 114. The switch control system 140 may be provided with one or more setpoints or desired values 141 and one or more feedback signals or values 118a from the feedback system 118 by which one or more closed loop motor drive control goals are achieved in normal motor drive operation. Feedback signals or values for the control functions can be based on signals and/or values 118a from the feedback system 118, measured input values (e.g., line voltages, currents, neutral voltages, currents, etc.), and other information, data, etc., which may be in any suitable form such as an electrical signal, digital data, etc., and which may be received from any suitable source, such as one or more sensors, an external network, switches, a user interface associated with the system 100, or other suitable source(s). The feedback circuit 118 provides feedback signal(s) or value(s) to the controller 140 from at least one of the rectifier 110a, the DC circuit 130, and the inverter 110b, and may provide measured motor speed values through appropriate tachometers or other sensors, and/or sensed values from which motor speed, torque, current, and/or voltage, etc. may be determined by the controller 140. In this regard, sensorless motor speed feedback values may be generated internally by the controller 140 via suitable motor models based on the feedback signals or values 118a even for systems having no direct motor speed measurement sensors.

Figure 2:
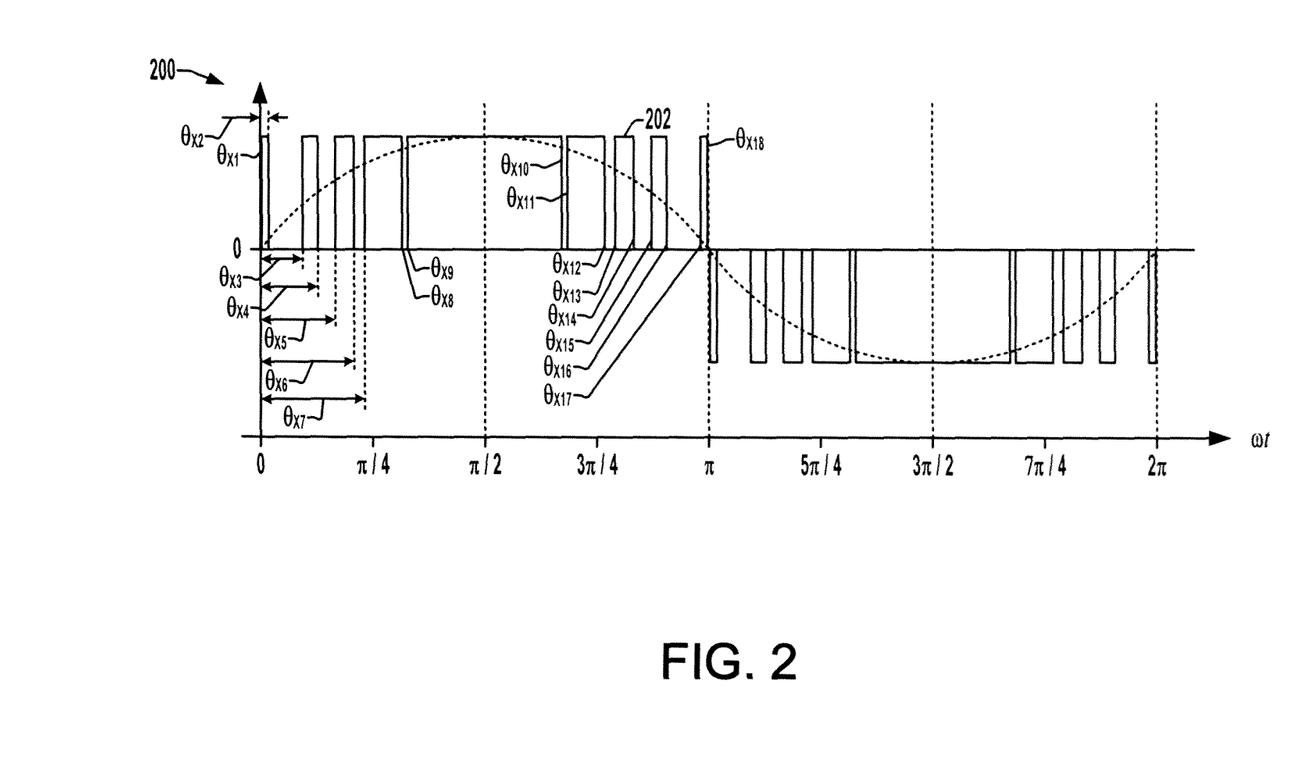
FIG. 2 is a plot showing an exemplary PWM switching pattern used in the rectifier of FIG. 1 with various switching angles determined according to the various techniques of the present disclosure for selectively eliminating or reducing certain harmonics and for controlling THD.

Referring also to FIG. 2, the rectifier controller 144a includes a PWM controller 150 that provides pulse width modulated rectifier switching control signals 142a to the switches S1-S6 of the rectifier 110a according to a set of rectifier switching angles. FIG. 2 provides a graph 200 illustrating an exemplary 9-pulse adaptive SHE PWM switching pattern 202 used in the rectifier controller 144b of FIG. 1 with various switching angles (including angles $\theta_{X,1}$-$\theta_{X,18}$ from a table 160 or from a real-time angle generator 152) in controlling the actuation of the rectifier switches S1-S6 in order to cause the rectifier 110a to convert AC electrical input power to provide regulated DC power to the intermediate DC circuit 130. In the illustrated 9-pulse implementation, the PWM controller provides the pulse pattern for selective connection of the input terminals to the DC conduction paths of the intermediate circuit 130 in both half-cycles of the AC input periods (e.g., AC source 111 provides sinusoidal input power at 60 Hz shown in dashed line in FIG. 2 in one example), with the switching angles $\theta_{X,1}$-$\theta_{X,18}$ being taken directly from the switching angle set. Although 9-pulse pattern is used to elaborate the principle, the actual number of pulses is not limited to 9.

As further shown in FIG. 1, in certain embodiments, the controller 144a includes a switching angle generator 152 that computes the switching angles substantially in real time based at least in part on one or more signals or values 118a indicative of source harmonics at the AC input 112 of the rectifier 110a and on a transfer function 154 of the rectifier input filter 112. The angle generator 152 in certain embodiments computes the set of rectifier switching angles substantially in real time based at least partially on the signals in feedback 118a containing the information of the source harmonics, on at least one harmonic to be reduced or eliminated, and on a desired THD value 158, which may be predetermined and stored in the switch control system 140 or which may be obtained as a signal or value from an external source.

Referring also to FIG. 3, in other embodiments, the rectifier controller 144a includes a switching angle set table 160 storing a plurality of sets of rectifier switching angles $\theta_{X,1}$-$\theta_{X,18}$, which can be stored in a memory of the controller 144a or elsewhere in the converter 110, or which may be stored in a separate system accessible by the PWM controller 150. FIG. 3 shows an exemplary angle set table 160 with firing angle sets corresponding to an integer number N source harmonic condition ranges. The table entries 160 also account for one or more other variables that the PWM controller 150 uses in selecting a particular angle set $\theta_{X,1}$-$\theta_{X,18}$. For example, the illustrated table 160 is divided into N portions, each having angle sets $\theta_{X,1}$-$\theta_{X,18}$ corresponding to one of N ranges of harmonic conditions at the AC input 112 (e.g., as measured by the feedback system 118 or as determined by separate measurements or estimations), for instance, in terms of one or more specific harmonics and/or total harmonic distortion of a given harmonic range (e.g., $2^{nd}$ through $40^{th}$ harmonic). In this example, each portion includes further divisions for particular rectifier delay angles and motor speeds. In operation, the PWM controller 150 receives feedback information 118a from the feedback system regarding the significant source harmonics at the current time, as well as rectifier delay angle and current motor speed, and uses these to index the table 160 to obtain the appropriate switching angle set $\theta_{X,1}$-$\theta_{X,18}$. The entries of the table 160 can be computed via an included angle generator 152 using input harmonic measurements 118a obtained from the feedback system 118 or may be computed separately from the converter 110 by an external switching angle generator 152 using the input filter transfer function 154, the desired THD value 158 and information regarding input source harmonic conditions, with the resulting sets of switching angles $\theta_{X,1}$-$\theta_{X,18}$ being provided to the converter 110 for storage in the table 160.

In operation, the PWM controller 150 receives the set of rectifier switching angles $\theta_{X,1}$-$\theta_{X,18}$ from the switching angle generator 152 or from the table 160 and generates the pulse width modulated rectifier switching control signals 142a as a series of pulses 200 (e.g., FIG. 2) accordingly so as to cause the rectifier 110a to convert AC electrical input power to provide regulated DC power to the intermediate DC circuit 130.

Figure 4:
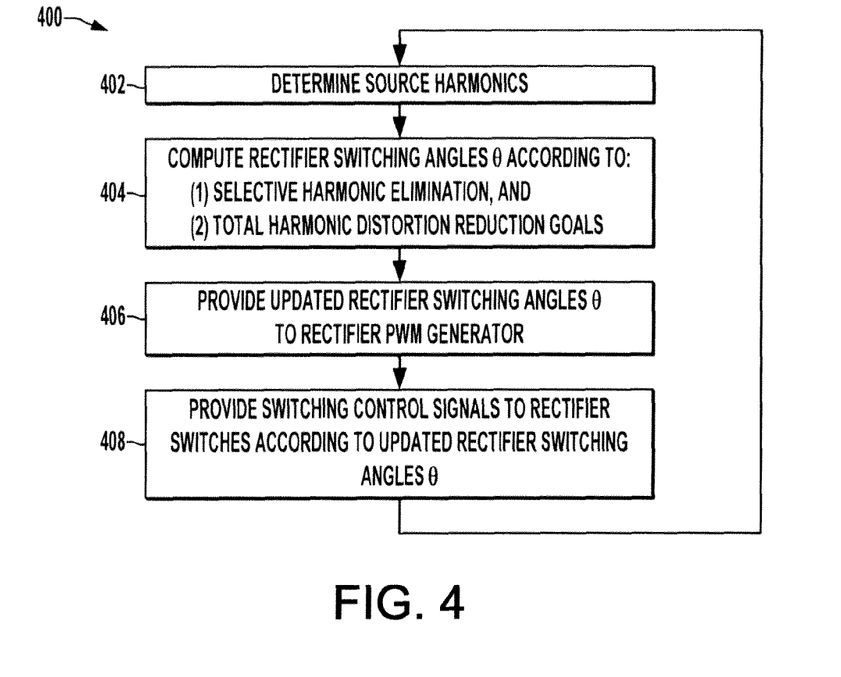
FIG. 4 is a flow diagram illustrating an exemplary method for rectifier PWM control including real-time switching angle computation in accordance with the disclosure.

Referring also to FIG. 4, an exemplary process 400 is illustrated for rectifier PWM control including real-time switching angle computation in accordance with the disclosure. Although the exemplary method 400 and other methods of the disclosure are illustrated and described below as a series of acts or events, the disclosure is not limited by the illustrated ordering of such acts or events. For example, some acts may occur in different orders and/or concurrently with other acts or events apart from those illustrated and/or described herein, and not all illustrated steps may be required to implement a process in accordance with the disclosure. Further, the methods may be implemented in association with the above described rectifier controller 144a as well as in association with other systems not illustrated. At 402, the switching angle generator 152 of the controller 144a determines source harmonics, for example, according to one or more feedback signals or values 118a, and computes a set of rectifier switching angles $\theta_{X,1}$-$\theta_{X,9}$ at 404 according to elimination of select harmonics (e.g., $5^{th}$, $7^{th}$ etc.) and according to the desired THD value 158, for instance, to maintain the total harmonic distortion corresponding to a range of harmonics of interest at or below a certain threshold (desired maximum) limit 158. At 406, the angle generator 152 provides the set of rectifier switching angles $\theta_{X,1}$-$\theta_{X,18}$ to the rectifier PWM controller 150. The PWM controller 150 provides updated switching control signals 142a to the rectifier switches S1-S6 at 408 according to the updated set of rectifier switching angles $\theta_{X,1}$-$\theta_{X,18}$ to operate the rectifier 110a.

Figure 5:
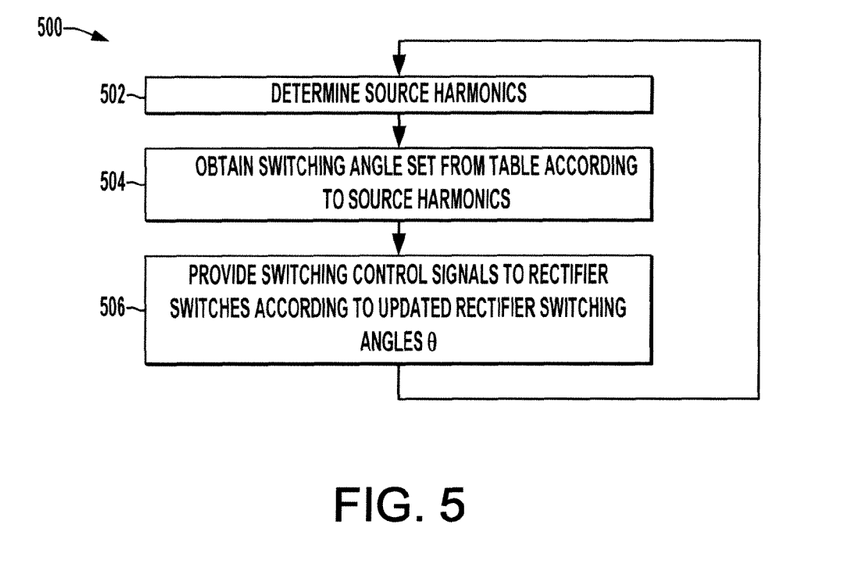
FIG. 5 is a flow diagram illustrating an exemplary method for rectifier PWM control using switching angles obtained from a table according to source harmonic conditions in accordance with the disclosure.

FIG. 5 illustrates another exemplary process 500 in which sets of switching angles are obtained from a table 160 according to source harmonic conditions. At 502, the PWM controller 150 determines the source harmonics, for example, according to one or more feedback signals or values 118a. The source harmonic conditions are used at 504 to obtain a corresponding switching angle set $\theta_{X,1}$-$\theta_{X,18}$ from the angle set table 160. At 506, the PWM controller 150 provides pulse width modulated rectifier switching control signals 142a to the rectifier 110a according to the selected set of rectifier switching angles $\theta_{X,1}$-$\theta_{X,18}$ to cause the rectifier 110a to convert AC electrical input power to provide regulated DC power to the intermediate DC circuit 130.

Figure 6:
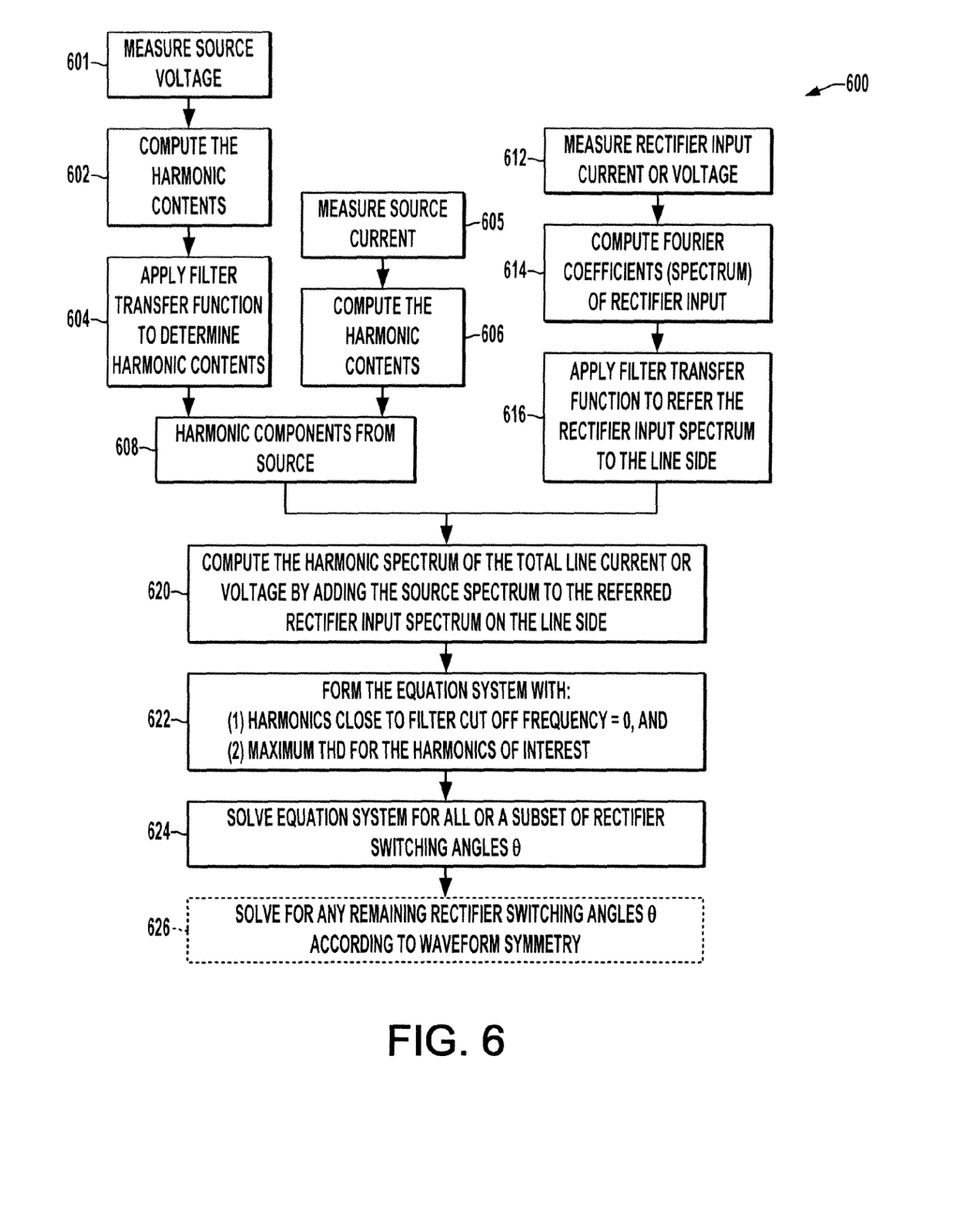
FIG. 6 is a flow diagram illustrating an exemplary method of computing rectifier switching angles in accordance with the disclosure.
Figure 7:
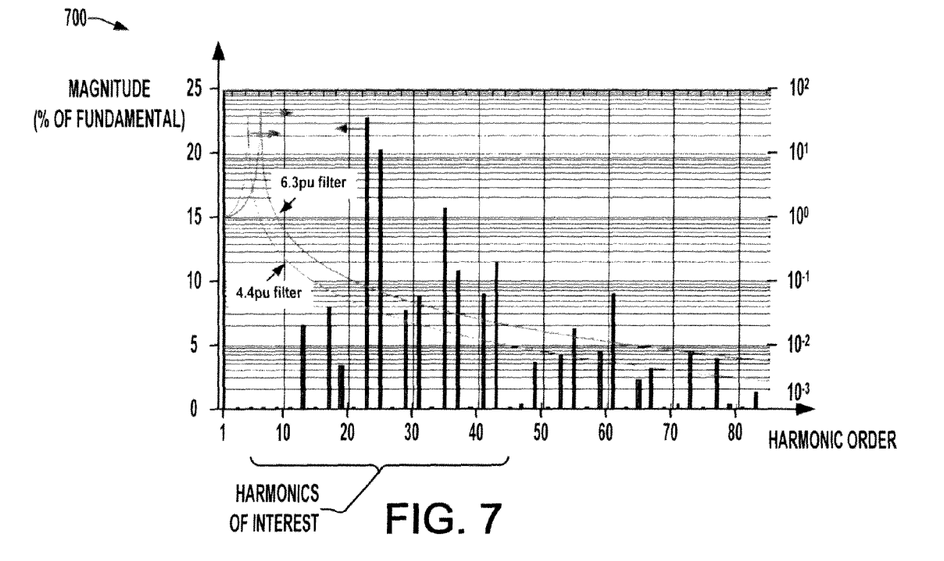
FIGS. 7 and 8 are graphs illustrating exemplary spectrums obtained from conventional and adaptive SHE techniques, respectively.
Figure 8:
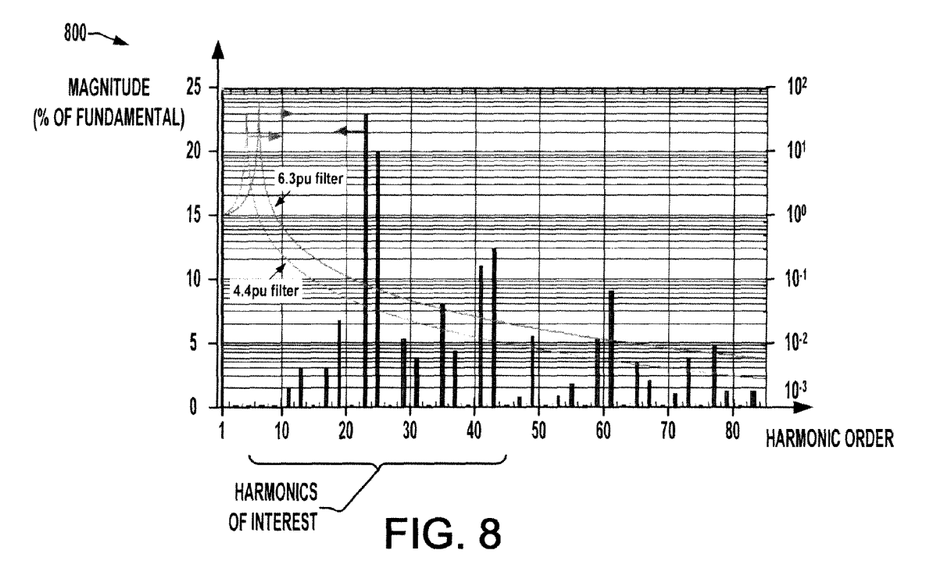

Referring also to FIGS. 6-8, the disclosure further provides methods for computing a set of rectifier switching angles $\theta_{X,1}$-$\theta_{X,18}$ for generating pulse width modulated rectifier switching control signals 142a using adaptive harmonic elimination in a power conversion system 110. FIG. 6 illustrates an exemplary process 600 for computing rectifier switching angles in accordance with the disclosure, and FIGS. 7 and 8 show exemplary spectrums obtained from conventional and adaptive SHE techniques, respectively. These techniques can be employed in real-time or substantial real-time using the integrated switching angle generator 152 described above, and/or the processes may be implemented in external systems in real-time or off-line, for instance, to generate switch angle set entries for storage in the controller table 160 in FIG. 1. The adaptive SHE approaches outlined herein involve formation and solution of an equation system based in whole or in part on the current or voltage spectrum of the power conversion system, one or more harmonics to be reduced or eliminated, and a minimized THD value.

The techniques can be used to implement an overall harmonic minimization strategy (Ohms) to facilitate reduction in THD, and advantageously takes into account the characteristics (e.g., transfer function) of the AC input filter 112. Thus, while conventional SHE techniques may not completely eliminate specific harmonics in practice due to the effects of source harmonic conditions and/or the effects of the input filter, the Ohms approach factors these effects into the computation of the switching angle sets $\theta_{X,1}$-$\theta_{X,18}$. Certain implementations begin with a Fast Fourier Transform (FFT) to obtain the expressions of harmonic components. The signal spectrum is then obtained by modifying the harmonic components according to the transfer function 154 of the input filter 112 to obtain a weighted spectrum, and the THD can be recalculated for minimization for the filtered signal. The process of minimization may or may not be coupled with extra constraints, such as a set of maxima for some critical harmonics for selected filter 112.

FIG. 7 shows a spectrum 700 of an SHE controlled rectifier adapted for 9-pulse operation in which the $5^{th}$, $7^{th}$ and $11^{th}$ harmonics are eliminated while higher-order harmonics have significant amplitudes not addressed by the SHE switching pattern. For these, an input filter 112 (low-pass) may be used, however, the filter tuning point must be low enough to effectively suppress the higher-order harmonics. FIG. 7 further illustrates transfer functions of two exemplary second-order input filters 112 having resonant frequencies of 4.4 pu and 6.3 pu, respectively. As seen in FIG. 7, the 6.3 pu filter has higher gain (around twice the gain of 4.4 pu filter) for the higher order harmonics, and simulation of this example shows the THD is higher than 5% for the 6.3 pu filter because of insufficient attenuation for higher order harmonics. At the same time, however, the 4.4 pu filter can be used for the desired THD at the price of larger and more expensive inductance and capacitance components. Moreover, the existing SHE approach does not take existing source harmonics into consideration, and the inventors have appreciated that source harmonics can adversely impact the line current THD after filtering.

FIG. 8 shows the filter waveforms and spectrum 800 of an exemplary 9-pulse pattern obtained via the Ohms technique in which the equation set is modified to force the THD over a range of harmonics of interest (e.g., $2^{nd}$ through $40^{th}$ in the illustrated example) to be at or below a desired THD threshold limit value 158, while still attempting to eliminate or reduce the $5^{th}$, $7^{th}$, and $11^{th}$ harmonics. In this manner, the Ohms technique controls the overall harmonic condition beyond the capabilities of conventional SHE approaches, and may further factor in the transfer function characteristics of the input filter 112. As seen in the example of FIG. 8, the $11^{th}$ harmonic is no longer completely eliminated, but the $13^{th}$ thru $19^{th}$ harmonics are reduced, whereby the total harmonic distortion in the range of interest is reduced. This pattern enables the use of a 6.3 pu line input filter 112 while achieving a THD of 5% or less. The 6.3 pu filter, in turn, needs only about half of the capacitance compared to a 4.4 pu filter, and thus the Ohms technique facilitates reduction in power conversion system cost and size.

The adaptive SHE techniques of the present invention can be implemented by substantially real-time computation of switching angle sets based on feedback of source harmonic conditions 118a, and it is also possible to calculate a subset of independent angles to obtain a set of angles $\theta_{X,1}$-$\theta_{X,18}$ for different source harmonics scenarios as shown in the table 160 in FIG. 3 above for intelligent selection according to source harmonics. The angle calculation in certain embodiments includes solving an equation set for all or a subset of firing angles, with any remaining angles (e.g., the non-independent angles) being obtained by calculations based on waveform symmetry. Examples of factors that can possibly affect the switching angles include preexisting harmonics that are significant to the filter, line filter resonant frequency, rectifier firing angles, DC current or voltage, and motor speed. Since the input filter 112 is most sensitive to the harmonics close to its tuning frequency, the preexisting harmonics that are calculated in certain implementations are those having the most significant filter gain. These techniques can be advantageously used for grid-tie PWM converters to improve the THD performance and are applicable to both current source and voltage source PWM converters.

Referring also to FIG. 6, the rectifier controller 144a employs selective harmonic elimination (SHE) type control component 150 in generating the switching control signals 142a. This technique effectively controls the PWM switching points in the output waveform to be at specific angles for control of harmonics and total harmonic distortion (THD). FIG. 6 illustrates an exemplary method 600 of computing a set of rectifier switching angles $\theta_{X,1}$-$\theta_{X,18}$ for generating pulse width modulated rectifier switching control signals 142a in a power conversion system 110. The process 600 can be used in real-time (e.g., in the on-board angle generator 152) or off-line. In general, the technique 600 involves forming an equation system (e.g., at 622) based at least partially on the current spectrum considering both harmonics from the rectifier and harmonics from the source, one or more harmonics to be reduced or eliminated, and a desired THD value 158, and solving the equation system (e.g., at 624) to obtain the set of rectifier switching angles $\theta_{X,1}$-$\theta_{X,18}$. In certain embodiments, an equation set is solved for a subset of the angles (e.g., independent angles $\theta_{X,1}$-$\theta_{X,9}$ in the example of FIG. 2) with any remaining angles (e.g., dependent angles $\theta_{X,10}$-$\theta_{X,13}$) being solved at 626 based on symmetry of the waveform 200 (FIG. 2).

In the embodiment of FIG. 6, the source voltage can be measured at 601 (e.g., via the feedback system 118) and the harmonic contents of interest are computed at 602, with the input filter transfer function 154 being applied at 604 to determine the source current, or the source current can be instead directly measured at 605 (e.g., via the feedback system 118) with the harmonic contents being computed at 606. The critical harmonics are calculated for the source current at 608, for example, a source current spectrum is obtained for the critical harmonic components including the fundamental current, according to the measured or determined source current. Also, the rectifier DC current (e.g., Idc in FIG. 1) or voltage is measured at 612 (e.g., via the feedback system 118) and a rectifier input current or voltage spectrum is computed at 614 (e.g., Fourier coefficients) according to the measured DC rectifier current or voltage. At 616 the input filter transfer function 154 is applied to the rectifier input current or voltage spectrum in order to refer the rectifier input current or voltage spectrum to the line side and thereby to obtain a referred or weighted rectifier input current or voltage spectrum. At 620, a total line current or voltage spectrum is computed as the sum of the source current or voltage spectrum and the referred rectifier input current or voltage spectrum. At 622, the equation system is formed based at least partially on the total line current or voltage spectrum, with application of various control constraints, such as forcing one or more harmonics of interest (e.g., $3^{rd}$, $5^{th}$, $11^{th}$, or others close to the input filter tuning point) set to zero or some other maximum value, and with a total harmonic distortion value for a given range of interest (e.g., as shown in FIGS. 7 and 8 above). The equation system is then solved at 624 to yield a subset of independent angles for the set of rectifier switching angles $\theta_{X,1}$-$\theta_{X,18}$ for use in controlling the PWM operation of the switching rectifier 110a. Non-independent angles can be obtained by using waveform symmetry at 626.

The following discussion further illustrates computational aspects of the process 600. Assuming a constant DC link (voltage or current) and an odd function $y_{pwm}$, any PWM waveform can be expressed in Fourier series:

$$y_{pwm} = \sum_{n=1}^{\infty} a_n \sin n\omega t, \qquad (1)$$

where $y_{pwm}$ represents rectifier input current for CSC, or rectifier input voltage for VSC, $a_n$ is the Fourier coefficient and can be calculated as:

$$a_n = \frac{1}{\pi}\int_0^{2\pi} y_{pwm} \sin n\omega t\, d(\omega t), \qquad (2)$$

which are functions of independent switching angles defining the PWM waveform. In traditional SHE, certain equation systems are obtained by forcing the Fourier coefficients to be equal to specific values. For instance, if the $5^{th}$ and $7^{th}$ harmonics are to be eliminated, $a_5$ and $a_7$ will be forced to be zero and $a_1$ will be forced to the value ma of the amplitude modulation index of the fundamental component. An integer number k independent angles are generally needed to define k independent equations, for example, with three unknown angles $\beta_1$, $\beta_2$ and $\beta_3$, three equations can be obtained to define modulation index, and eliminate $5^{th}$ and $7^{th}$ harmonics:

$$\begin{cases} a_1(\beta_1,\beta_2,\beta_3) = m_a \\ a_5(\beta_1,\beta_2,\beta_3) = 0 \\ a_7(\beta_1,\beta_2,\beta_3) = 0, \end{cases} \qquad (3)$$

or to eliminate three harmonics (e.g., $5^{th}$, $7^{th}$ and $11^{th}$ with fixed modulation index:

$$\begin{cases} a_5(\beta_1,\beta_2,\beta_3) = 0 \\ a_7(\beta_1,\beta_2,\beta_3) = 0 \\ a_{11}(\beta_1,\beta_2,\beta_3) = 0 \end{cases} \qquad (4)$$

These equations can be solved for switching angles $\beta_1$, $\beta_2$ and $\beta_3$.

In the adaptive SHE and Ohms techniques of the present disclosure, one or more additional conditions are considered, including without limitation existing source harmonics and harmonics caused by the rectifier. When looking into the filter 112 from the power system, the transfer function of the filter is $h_1(n\omega)$, and the line current harmonics caused by the source harmonics are:

$$i_{src} = \sum_{n=1}^{\infty} h_1(n\omega) V_n \sin(n\omega t + \varphi_n). \qquad (5)$$

Regarding the harmonics caused by the rectifier, when looking into the filter 112 from the rectifier, the transfer function of the filter is $h_2(n\omega)$. The harmonics in the line current caused by PWM waveform can be expressed as:

$$i_{line,pwm} = h_2 y_{pwm} = \sum_{n=1}^{\infty} h_2(n\omega) a_n \sin(n\omega t + \phi_n). \qquad (6)$$

The overall line current is the sum of:

$$\begin{aligned} i_{line} &= i_{scr} + i_{line,pwm} \\ &= \sum_{n=1}^{\infty} [h_1(n\omega) V_n \sin(n\omega t + \varphi_n) + h_2(n\omega) a_n \sin(n\omega t + \phi_n)] \\ &= \sum_{n=1}^{\infty} (a'_n \sin(n\omega t) + b'_n \cos(n\omega t)), \end{aligned} \qquad (7)$$

where $$\begin{aligned} a'_n &= h_1(n\omega) V_n \cos\varphi_n + h_2(n\omega) a_n \cos\phi_n \\ b'_n &= h_1(n\omega) V_n \sin\varphi_n + h_2(n\omega) a_n \sin\phi_n \\ c'_n &= \sqrt{a'^2_n + b'^2_n}. \end{aligned} \qquad (8)$$

For overall harmonic minimization (Ohms), assuming there are 4 independent angles, $5^{th}$, $7^{th}$ and $11^{th}$ to be eliminated, as well as a THD to be minimized/reduced, the equation system will be given as follows:

$$\begin{cases} a'_5 = b'_5 = 0 \\ a'_7 = b'_7 = 0 \\ a'_{11} = b'_{11} = 0 \\ \sum_{n=2}^{k} (c'_n/c'_1)^2 \leq THD_0^2, \end{cases} \quad (9)$$

where k is the order of harmonics of interest, $THD_0$ is the allowable total harmonic distortion value 158 (e.g., set according to related standards or other user requirements). The angle generator 152 (real-time or off-line) can then solve the above equation (9) to yield a set of angles $\theta_{X,1}$-$\theta_{X,4}$ for use in controlling the rectifier 110a.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
    a rectifier comprising:
        an AC input circuit with a rectifier input filter and a plurality of AC input nodes to receive AC electrical input power,
        a DC output with first and second DC output nodes, and
        a plurality of rectifier switching devices individually coupled between one of the AC input nodes and one of the first and second DC output nodes, the rectifier switching devices individually operative to selectively couple the corresponding AC input node with the corresponding DC output node according to a corresponding rectifier switching control signal;
    an intermediate DC circuit comprising first and second DC current paths coupled with the first and second DC output nodes of the rectifier;
    an inverter comprising an AC output with a plurality of AC output nodes for supplying power to a load, the inverter operative to convert DC power from the intermediate circuit to provide AC electrical output power to the load; and
    a switch control system with a rectifier control component comprising:
        a switching angle generator operative to compute a set of rectifier switching angles substantially in real time based at least partially on at least one signal or value indicative of source harmonics at the AC input of the rectifier and on a transfer function of the rectifier input filter, and
        a PWM controller receiving the set of rectifier switching angles from the switching angle generator and operative to provide pulse width modulated rectifier switching control signals to the rectifier according to the set of rectifier switching angles to cause the rectifier to convert AC electrical input power to provide regulated DC power to the intermediate DC circuit.

2. The power conversion system of claim 1, where the switching angle generator is operative to compute the set of rectifier switching angles substantially in real time based at least partially on:
    at least one harmonic to be reduced or eliminated; and
    a desired total harmonic distortion value.

3. The power conversion system of claim 2, where the switching angle generator is operative to compute the set of rectifier switching angles substantially in real time by:
    computing a source current or voltage spectrum according to a measured or determined source current or voltage;
    computing a rectifier input current or voltage spectrum according to a measured rectifier DC current or measured rectifier DC voltage;
    applying the transfer function of the rectifier input filter to the rectifier input current or voltage spectrum to refer the rectifier input current or voltage spectrum to the line side to obtain a referred rectifier input current or voltage spectrum;
    computing a total line current or voltage spectrum as a sum of the source current or voltage spectrum and the referred rectifier input current or voltage spectrum;
    forming an equation system based at least partially on the total line current or voltage spectrum;
    solving the equation system to obtain the set of rectifier switching angles.

4. The power conversion system of claim 3, where the switching angle generator is operative to form the equation system based at least partially on the at least one harmonic to be reduced or eliminated and on the desired total harmonic distortion value.

5. The power conversion system of claim 4, where the rectifier is a current source rectifier and where the intermediate circuit includes at least one inductance.

6. The power conversion system of claim 3, where the rectifier is a current source rectifier and where the intermediate circuit includes at least one inductance.

7. The power conversion system of claim 2, where the rectifier is a current source rectifier and where the intermediate circuit includes at least one inductance.

8. The power conversion system of claim 1, where the rectifier is a current source rectifier and where the intermediate circuit includes at least one inductance.

9. The power conversion system of claim 1, where the power conversion system is a distributed power generation system, where the rectifier is a grid-tie current source converter, and where the intermediate circuit includes at least one inductance.

10. The power conversion system of claim 1, where the power conversion system is a distributed power generation system, where the rectifier is a 2-level or multilevel grid-tie voltage source converter, and where the intermediate circuit includes at least one capacitance.

11. The power conversion system of claim 1, where the rectifier is a 2-level or multilevel voltage source rectifier and where the intermediate circuit includes at least one capacitance.

12. The power conversion system of claim 1, where the power conversion system is a motor drive, and where the plurality of AC output nodes of the inverter supply power to a motor load.

13. A power conversion system, comprising:
a rectifier comprising:
an AC input circuit with a rectifier input filter and a plurality of AC input nodes to receive AC electrical input power,
a DC output with first and second DC output nodes, and
a plurality of rectifier switching devices individually coupled between one of the AC input nodes and one of the first and second DC output nodes, the rectifier switching devices individually operative to selectively couple the corresponding AC input node with the corresponding DC output node according to a corresponding rectifier switching control signal;
an intermediate DC circuit comprising first and second DC current paths coupled with the first and second DC output nodes of the rectifier;
an inverter comprising an AC output with a plurality of AC output nodes for supplying power to a load, the inverter operative to convert DC power from the intermediate circuit to provide AC electrical output power to the load; and
a switch control system with a rectifier control component comprising:
a switching angle set table storing a plurality of sets of rectifier switching angles, and
a PWM controller operative to select one of the sets of rectifier switching angles based at least partially on at least one signal or value indicative of source harmonics at the AC input of the rectifier, and operative to provide pulse width modulated rectifier switching control signals to the rectifier according to the selected set of rectifier switching angles to cause the rectifier to convert AC electrical input power to provide regulated DC power to the intermediate DC circuit.

14. The power conversion system of claim 13, where the power conversion system is a motor drive.

15. The power conversion system of claim 13, where the rectifier is a current source rectifier and where the intermediate circuit includes at least one inductance.

16. The power conversion system of claim 13, where the rectifier is a 2-level or multilevel voltage source rectifier and where the intermediate circuit includes at least one capacitance.

17. The power conversion system of claim 13, where the power conversion system is a distributed power generation system, where the rectifier is a current source grid tie converter, and where the intermediate circuit includes at least one inductance.

18. The power conversion system of claim 13, where the power conversion system is a distributed power generation system, where the rectifier is a 2-level or multilevel voltage source rectifier, and where the intermediate circuit includes at least one capacitance.

19. A method of computing a set of rectifier switching angles for generating pulse width modulated rectifier switching control signals in a power conversion system, the method comprising:
using at least one processor, forming an equation system based at least partially on:
a current or voltage spectrum of the power conversion system,
at least one harmonic to be reduced or eliminated, and
a desired maximum total harmonic distortion value; and
using the at least one processor, computing a set of rectifier switching angles by solving the equation system.

20. The method of claim 19, where the equation system is formed using the at least one processor based at least partially on a total line current spectrum including a source current or voltage spectrum and a rectifier input current or voltage spectrum referred to the line side.

21. The method of claim 20, comprising:
using the at least one processor, computing a source current or voltage spectrum according to a measured or determined source current or voltage;
using the at least one processor, computing a rectifier input current or voltage spectrum according to a measured rectifier DC current or voltage;
using the at least one processor, applying the transfer function of the rectifier input filter to the rectifier input current or voltage spectrum to refer the rectifier input current or voltage spectrum to the line side to obtain a referred rectifier input current or voltage spectrum; and
using the at least one processor, computing a total line current or voltage spectrum as a sum of the source current or voltage spectrum and the referred rectifier input current or voltage spectrum;
wherein the equation system is formed based at least partially on the total line current or voltage spectrum.

22. The method of claim 21, where the set of rectifier switching angles is solved in real time using the at least one processor.

23. The method of claim 19, comprising:
using the at least one processor, computing a source current or voltage spectrum according to a measured or determined source current or voltage;
using the at least one processor, computing a rectifier input current or voltage spectrum according to a measured rectifier DC current or voltage;
using the at least one processor, applying the transfer function of the rectifier input filter to the rectifier input current or voltage spectrum to refer the rectifier input current or voltage spectrum to the line side to obtain a referred rectifier input current or voltage spectrum; and
using the at least one processor, computing a total line current or voltage spectrum as a sum of the source current or voltage spectrum and the referred rectifier input current or voltage spectrum;
wherein the equation system is formed based at least partially on the total line current or voltage spectrum.

24. The method of claim 19, where the set of rectifier switching angles is solved in real time using the at least one processor.

25. A power conversion system, comprising:
a rectifier with an input receiving AC input power and a DC output for driving a load;
a filter circuit coupled with the rectifier input; and
a rectifier controller, comprising:
a switching angle generator operative to compute a set of rectifier switching angles substantially in real time based at least partially on source harmonics at the rectifier input and on a transfer function of the filter circuit, and
a PWM controller operative to provide pulse width modulated rectifier switching control signals to the rectifier according to the set of rectifier switching angles to cause the rectifier to convert the AC input power to provide regulated DC power at the DC output.

26. The power conversion system of claim 25, where the switching angle generator is operative to compute the set of rectifier switching angles substantially in real time based at least partially on:
   at least one harmonic to be reduced or eliminated; and
   a desired total harmonic distortion value.

27. The power conversion system of claim 26, where the switching angle generator is operative to compute the set of rectifier switching angles substantially in real time by:
   computing a source current or voltage spectrum according to a measured or determined source current or voltage;
   computing a rectifier input current or voltage spectrum according to a measured rectifier DC current or measured rectifier DC voltage;
   applying the transfer function of the filter circuit to the rectifier input current or voltage spectrum to refer the rectifier input current or voltage spectrum to the line side to obtain a referred rectifier input current or voltage spectrum;
   computing a total line current or voltage spectrum as a sum of the source current or voltage spectrum and the referred rectifier input current or voltage spectrum;
   forming an equation system based at least partially on the total line current or voltage spectrum;
   solving the equation system to obtain the set of rectifier switching angles.

28. The power conversion system of claim 27, where the switching angle generator is operative to form the equation system based at least partially on the at least one harmonic to be reduced or eliminated and on the desired total harmonic distortion value.

29. The power conversion system of claim 25, where the rectifier is a current source rectifier.

30. The power conversion system of claim 25, comprising:
   an intermediate DC circuit with first and second DC current paths coupled with the rectifier DC output; and
   an inverter operative to convert DC power from the intermediate circuit to provide AC electrical output power to a load.

* * * * *